J. R. CREIGHTON.

Speaking-Tubes.

No. 5,580.

Reissued September 30, 1873.

Witnesses.
Ewell Dick
Wm. E. Chaffee

Inventor.
James R. Creighton
by atty A Louck

AM. PHOTO-LITHOGRAPHIC Co. N.Y. (OSBORNE'S PROCESS.)

UNITED STATES PATENT OFFICE.

JAMES R. CREIGHTON, OF BOSTON, MASSACHUSETTS, ASSIGNOR OF ONE-HALF INTEREST TO OSBORN B. HALL, 2D.

IMPROVEMENT IN SPEAKING-TUBES.

Specification forming part of Letters Patent No. 91,827, dated June 29, 1869; reissue No. 5,580, dated September 30, 1873; application filed September 6, 1873.

*To all whom it may concern:*

Be it known that I, JAMES R. CREIGHTON, of Boston, in the county of Suffolk and State of Massachusetts, have made an invention of a new and useful device for communicating intelligence or messages from one apartment or portion of a dwelling, hotel, or structure of any kind to another, which invention I term an Annunciator; and do hereby declare the following to be a full, clear, and exact description thereof, due reference being had to the accompanying drawing making part of this specification, and in which—

Figure 3:
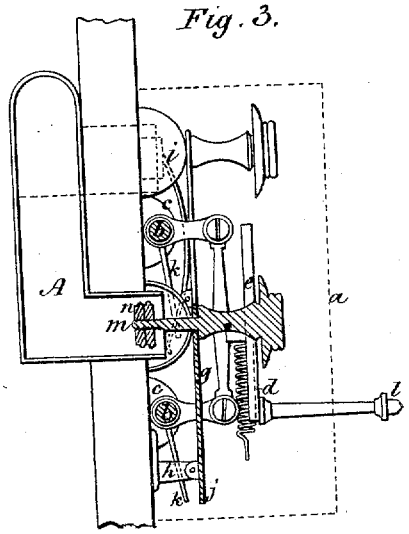
Figure 2:
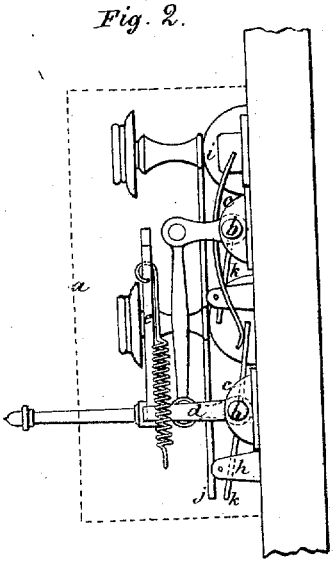
Figure 1:
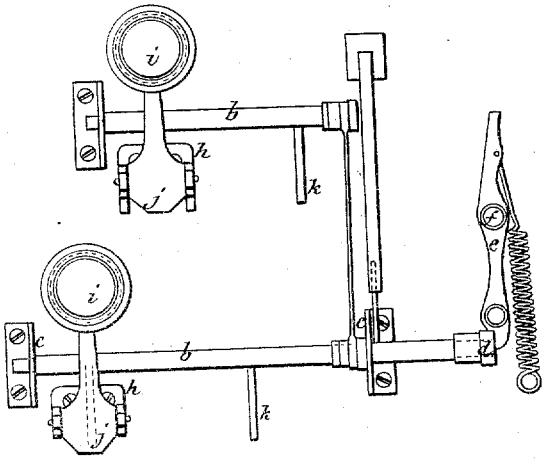

Figure 1 is a front view or representation of the alarm mechanism of my invention with the exterior of its case removed. Fig. 2 is an end elevation, and Fig. 3 a transverse section, of such mechanism, as connected with an ordinary speaking-tube, with which it is designed to be connected.

In the use of speaking-tubes, as now universally applied and employed, it is well known that, in many instances, and more especially in cities, the slight sound emitted by the human voice, or of the whistle, which is employed as a signal of a desire to communicate intelligence, is often indistinctly or entirely unheard, even at a short distance from the outlet of the tube, while at some distance from such tube, or in another apartment, the sound is not perceptible.

My present invention relates to means whereby distinct notice may be instantly given of a desire on the part of one individual to communicate intelligence to another, who may be in a different apartment or portion of the building, even at a considerable distance from the speaker; and such invention consists in the employment, in connection with an ordinary speaking-tube, of an alarm-escapement of any suitable construction, and in combining with such alarm-escapement and speaking tube or tubes one or more tilting or drop valves or knobs in such manner that, upon blowing into the tube, the valve shall be tilted and caused to drop by its own gravity, and in its descent to release and set in motion the alarm, by this means giving immediate and decisive notice to the person nearest the opposite end of the tube of a communication to be made.

In the drawings before alluded to as accompanying this specification, and which illustrate my invention, A denotes a portion of a speaking-tube, which is supposed to be fixed in position within the walls of a building in the usual manner, except that its extremities open into a box or case, *a*, suitably affixed to the wall of the apartment.

In carrying out my invention I dispose within the case or box *a*, and preferably immediately below either orifice of the speaking-tube, a rocker shaft or rod, *b*, supported, and so as to freely turn, in suitable bearings or brackets *c c*, &c., one end of such shaft terminating at or near the tube, while its opposite is conducted to the locality at which it is desired to place the alarm mechanism, whether immediately adjacent to, and in the same apartment with, the termination of the tube, or at some considerable distance therefrom, according to the varying condition of the nature or occupancy of the structure in which it is placed. To this remote or actuating end of the shaft *b* I affix a horizontal arm or tripper, *d*, and in close proximity to such arm I dispose an alarm escapement or mechanism of any proper construction—that of an ordinary clock, for instance. Between the free extremity of the alarm or tripper *d* and the alarm-escapement I arrange a means of releasing or sounding such alarm upon any movement of the former from its set position, such means, in the present instance, consisting of an oscillating lever, *e*, suitably fulcrumed at about its center, as shown at *f*, to the inner face of the front of the case *a*, a coiled spring being connected with the upper extremity of such lever, and serving to retain its lower extremity in contact with the tripper *d*, as shown in the accompanying drawing, except under conditions hereinafter stated, it being understood that this lower end of the lever *e* is to be so disposed with respect to the alarm-escapement or to an ordinary gong as to strike such alarm or gong when released from contact with the tripper. Immediately below the orifice of the speaking-tube, and within the case A, I dispose a tilting standard or support, *g*, and pivot such standard near its lower end to a suitable bracket, *h*, and so that, upon a slight departure from a perpendicular position, the standard shall be caused to turn upon its pivot by the gravity of its free end, or of a weight or knob, *i*, applied thereto. The descent of the upper and longer arm or portion of the standard *g* produces, of course, a corresponding elevation of its lower and shorter arm *j*, which, in its ascent, impinges against a finger, *k*, fixed upon the rocker-shaft *b*, and by this means effects a partial revolution of such shaft, sufficient to release its tripper *d* from contact with the lever *e*, and sound an alarm.

The lower arm of the lever *e* should be provided with a handle, *b*, extending through the front of the case, for enabling such arm to be depressed at the proper time.

The knob *i*, before alluded to as fixed upon the standard *g*, as well as the handle *l*, may be made in any form or design which taste may dictate, and may be made to present a very ornamental appearance.

As the weight of the knob is to effect the motion of the rocker-shaft, and as the power exerted by the knob or its standard is directly dependent upon the length of such standard, it will be obvious that its length should be proportioned to the length of the rocker-shaft and the number of its bearings.

The standard *g* should be as nearly as possible balanced in position, as will be consistent with its upright position, and the inner end of its knob should cover or close the orifice of the speaking-tube. Under these conditions a movement of air within the tube, put in motion by blowing into one extremity thereof, will tilt the standard *g* from a perpendicular position, and allow its outer end to drop, as before stated.

In order to adjust as nicely as possible the balancing of the standard and knob, the inner face or end of the latter may be provided with a male screw, *m*, upon which is secured a weight or nut, *n*, the effect of which will be apparent to intelligent persons.

When my invention is applied to a structure containing a number of apartments and of tubes—such as hotels—one extremity of all these tubes, according to location, is to be conducted to and communicate with the case *a*, and such case is to be located in the office of such hotel.

A standard and rocker-shaft are to be combined with both ends of each tube, as in the example before explained, and all the shafts are to be suitably connected with the one which actuates the alarm mechanism.

The operation of the above-described arrangement of parts is as follows, the explanation being premised by the supposition that the standard or standards are in a perpendicular position, and the lever *e* in contact with the tripper *d*. A person wishing to give a signal to call attention to himself blows into the orifice of the tube nearest him. This act, as before stated, has the effect of tilting the standard *g* from its perpendicular position and releasing the alarm mechanism. Upon hearing this alarm a person nearest at hand refers to the case *a*, and upon seeing one knob lowered, and applying his ear to the orifice of the tube thus exposed, as the knobs are numbered or otherwise impressed to correspond with the character designating the apartment with which the tube is connected, the attendant of the case *a* at once understands from which apartment the signal proceeds. After answering this signal the knob is to be returned to its normal position, and the lever *e* lowered and "set" against the tripper *d*, as at first.

For convenience in blowing within the tube a movable mouth-piece may be suspended by a cord in immediate proximity to the orifice of such tube, and when it becomes desirable to blow or speak within the tube this mouth-piece is to be inserted therein and then withdrawn.

I would call attention to the fact that the inner end of the knob *i* is made in the form of a hemispherical cup, as this form is found to offer the most resistance to a current of air. I would also call attention to the fact that when the standard *g* is in an upright position its lower end is separated somewhat from the finger *k*, in order to allow the standard to be started from its perpendicular position by a slight puff of air within the tube, as well as to allow its knob to acquire considerable momentum before striking the finger *k*, which actuates the rocker-shaft, and through it the alarm mechanism.

I would further remark that the lever (shown at *e* in the drawing) is a portion of the helve of a hammer, the head of which, coming in contact with the alarm bell or gong, gives a signal.

I claim as my invention and desire to secure by Letters Patent of the United States—

1. The combination, with a speaking-tube, of a tilting-plate valve pivoted in such manner that upon blowing within the tube such device is so tilted or operated as to release or set in action a suitable alarm or signal connected with the same, substantially as and and for purposes stated.

2. The combination, with a speaking-tube, of a tilting valve, whose support is a rock-shaft located immediately at one extremity of the tube, the overbalance of the valve against or toward the tube being so slight that a current of wind from within the tube against the valve will overcome and drop the valve, substantially as and for purposes stated.

3. The construction and arrangement of the tilting arm *g* with its knob *i*, the rocker-shaft *b* with its tripper *d*, and finger *k*, and the oscillating lever *e*, the latter being actuated by the spring and disposed in connection with the rocker-shaft and an alarm mechanism, and the whole being arranged and operating substantially as hereinbefore explained.

JAS. R. CREIGHTON.

Witnesses:

FRANCIS E. FAXAN,

W. E. BOARDMAN.